F. A. KNAPP.
GRINDING MACHINE.
APPLICATION FILED APR. 14, 1910.
988,577.
Patented Apr. 4, 1911.
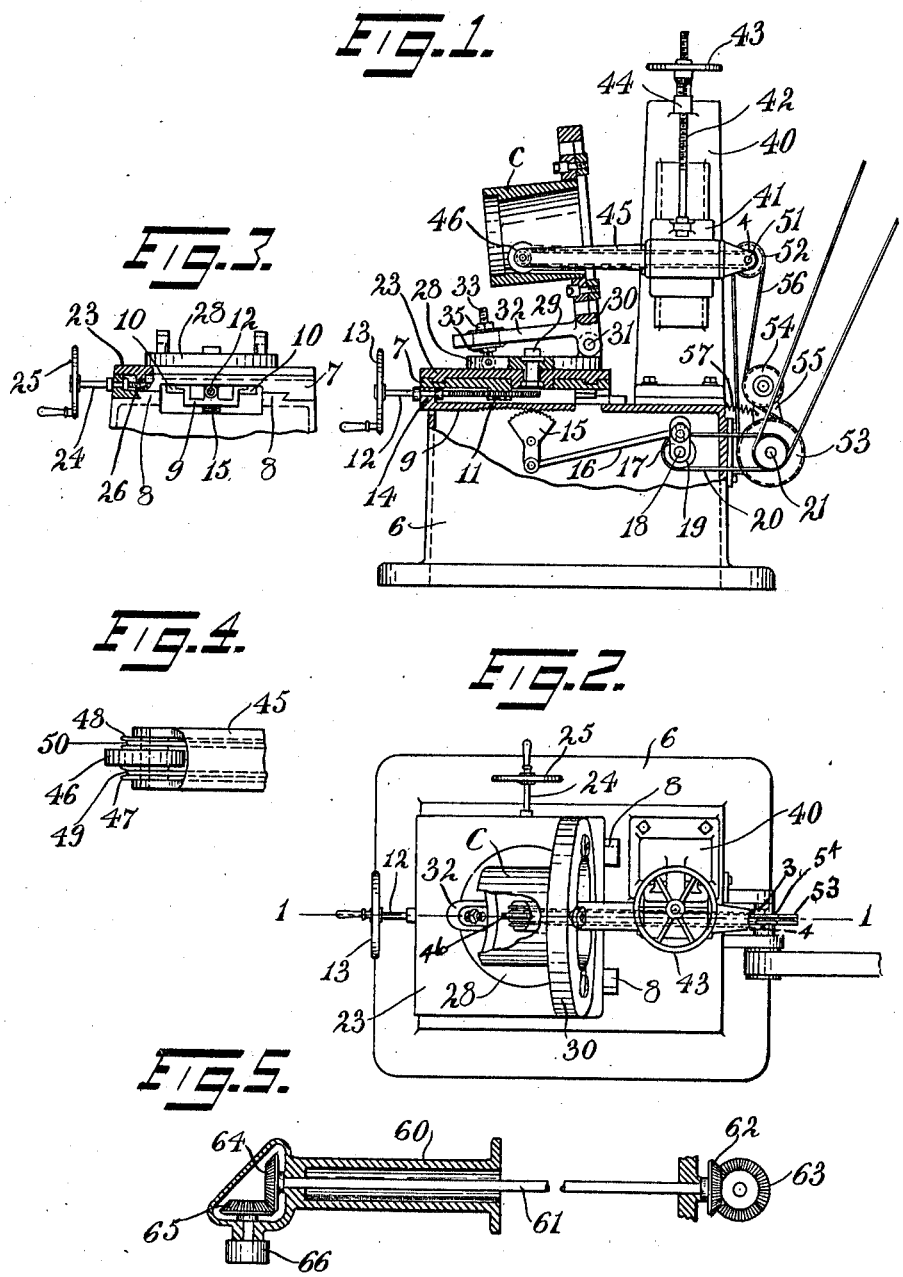

UNITED STATES PATENT OFFICE.

FRANK A. KNAPP, OF NEWARK, NEW JERSEY.

GRINDING-MACHINE.

988,577. Specification of Letters Patent. Patented Apr. 4, 1911.

Application filed April 14, 1910. Serial No. 555,337.

*To all whom it may concern:*

Be it known that I, FRANK A. KNAPP, a citizen of the United States, residing in Newark, in the county of Essex and State of New Jersey, have invented certain new and useful Improvements in Grinding-Machines, of which the following is a specification.

This invention relates to grinding mechanism and has for its object to provide an improved machine especially adapted for grinding slots of various kinds such as keyways in various articles.

In the accompanying drawing representing embodiments of my invention, Figure 1 is a vertical section through the machine on the line 1—1 indicated in Fig. 2. Fig. 2 is a plan view. Fig. 3 is a portion of an end elevation. Fig. 4 shows enlarged the end portion of the arm carrying the grinding wheel. Fig. 5 shows enlarged a section through the arm and connected parts for operating the grinding wheel of a modification.

The machine is shown as comprising a frame 6 on which a carriage 7 is mounted to reciprocate transversely being guided by gibs 8 on the frame. A rack bar 9 is slidable in ways 10 on the bottom of the carriage and has a threaded socket 11 engaged by a screw rod 12, that is swung by a wheel 13 at the front of the machine. This screw rod turns in a socket 14 at the front of the carriage and prevented from endwise movement, whereby the rack is longitudinally adjusted on the carriage. A segment gear 15 pivotally swings below the carriage to engage the rack bar whereby the carriage can be reciprocated. The segment gear is pivoted to a connecting rod 16 swung from a crank 17 on a shaft 18, the latter carries a pulley 19 rotated by belt 20 from a suitable pulley on a main driving shaft 21. By this means the carriage is reciprocated. Turning the screw rod will adjust the rack on the carriage and vary the path of movement on the carriage.

On the carriage is mounted a bed 23 that slides transversely on the carriage and is adjusted by means of a screw rod 24 having hand wheel 25, the rod, being prevented from endwise movement, and screwing into a nut portion 26 on the carriage.

On the carriage is a plate 28 through which passes a clamp bolt 29 whereby the plate can be swung on this pivot and clamped in adjusted positions. This plate has an upright standard 30 pivoted thereto at 31 to swing on a horizontal axis. An arm 32 extends horizontally from the standard adjacent its base and is adjustably secured to the standard by means of a bolt 33 pivoted to the plate and passing through the arm, and locked thereto by clamp nuts 35. By this means the angle of the support relative to the vertical line can be adjusted. Suitable means are provided for clamping the article on this support. Where annular or cylindrical articles are to be operated upon such, as to have a key slot cut therein, the support is made annular as shown.

On the frame is mounted a pillar 40 on which is guided a head 41 in vertical gibs, and adjusted by means of a screw 42 and a nut and wheel 43 on the screw beyond a collar 44. The head 41 carries a cross arm 45 extending toward or into the annular support 30. At the end of this arm is a grinding wheel 46 that is rotated from the driving shaft 21 in any suitable manner. The wheel is shown as rotated by a pair of pulleys 47 and 48 having suitable belts 49 and 50 passing around pulleys 3 and 4 on a spindle 51 mounted on the rear of the head. A pulley 52 on the latter spindle has a belt 56 that passes around a pulley 53 on the shaft 21 by which means the grinding wheel is continuously rotated. In order to allow for the vertical adjustment of the head and grinding wheel an idler pulley 54 is carried on an arm 55 and the pulley pressed against the belt 56 that drives the grinder from the main shaft by spring 57.

In Fig. 5 is shown a modification in which an arm 60 is carried by the head 41 and serves to support a shaft 61 having a miter gear 62 at its rear end engaging the miter gear 63 suitably driven. A miter gear 64 on the outer end of the shaft engages a miter 65 on the spindle of a grinding wheel 66.

In the operation of the device the article such as a cylindrical member C is suitably clamped in an annular support with the grinding arm projecting into it. The arm 32 is adjusted to give the proper path of movement of the grinding wheel through the article when the article is reciprocated. The rack bar is suitably adjusted on the table by turning the hand wheel 13 to give the proper stroke. Upon operation of the driving shaft the grinding wheel will be rotated on the stationary arm and the carriage will be reciprocated toward and from the pillar whereby the article will be reciprocated in the plane of the grinding wheel, and the latter will cut a groove or channel in the article. The vertical feed of the article and grinding wheel toward each other is effected by the hand wheel 43, permitting the head and arm carrying the grinding wheel to be lowered. Lateral adjustment of the article relative to the grinding wheel is effected by turning the hand wheel 25. The clamping bolt 29 can be loosened and the article swung on a vertical pivot for proper adjustment when desired.

Having thus described my invention, I claim:

1. In a grinding machine, the combination of a frame, a carriage mounted on the frame to reciprocate longitudinally, an upright standard pivoted to swing on the carriage on a horizontal axis, means for swinging said standard and locking it in adjusted positions, a support carried by the standard, a pillar mounted on the frame in proximity to the said standard, an arm extending horizontally from the pillar and vertically adjustable thereon, a grinding wheel carried by said arm, means for rotating the grinding wheel, a rack bar longitudinally adjustable on the carriage, and a segment gear engaging the rack bar and provided with means for oscillating in a fixed path.

2. In a grinding machine, the combination of a frame, a carriage mounted on the frame to reciprocate longitudinally, a table mounted on the carriage to slide transversely, means for adjusting the table on the carriage, a bed adjustable on the table longitudinally, means for adjusting the bed, a plate mounted on the bed for circular adjustment, means for locking the plate in adjusted positions, an upright standard pivoted to swing on the plate on a horizontal axis, means for swinging said standard and locking it in adjusted positions, a support carried by the standard, a pillar mounted on the frame in proximity to the said standard, an arm extending horizontally from the pillar and vertically adjustable thereon, a grinding wheel carried by said arm, means for rotating the grinding wheel, and means for reciprocating the table and said parts carried thereby toward and from the pillar.

3. In a grinding machine, the combination of a frame, a carriage mounted on the frame to reciprocate longitudinally, a table mounted on the carriage to slide transversely, means for adjusting the table on the carriage, a bed adjustable on the table longitudinally, means for adjusting the bed, a plate mounted on the bed for adjustment on a pivot, means for locking the plate in adjusted positions, an upright standard pivoted to swing on the plate on a horizontal axis, an arm on the standard extending across the bed, adjustable means connecting the arm extremity with the bed to swing the arm and standard, and secure them in adjusted positions, a support carried by the standard, a pillar mounted on the frame in proximity to the said standard, an arm extending horizontally from the pillar and vertically adjustable thereon, a grinding wheel carried by said arm, means for rotating the grinding wheel, and means for reciprocating the table and said parts carried thereby toward and from the pillar.

FRANK A. KNAPP.

Witnesses:
WILLIAM H. REID,
FRED. J. DOLE.

Copies of this patent may be obtained for five cents each, by addressing the "Commissioner of Patents, Washington, D. C."